3,682,632
COPYING MATERIAL FOR USE IN ELECTRO-
PHOTOGRAPHY
Fumiaki Arai, Tokyo, Wasaburo Ohta and Junki Kuro-
kawa, Yokohama-shi, Kanagawa-ken, Noriyuki Usui,
Kawasaki-shi, Kanagawa-ken, Sakae Shimizu, Tokyo,
and Tetsuo Tanaka, Kusakabe-shi, Saitama-ken, Japan,
assignors to Kabushiki Kaisha Ricoh, Tokyo, Japan
Filed June 4, 1969, Ser. No. 830,252
Claims priority, application Japan, June 14, 1968,
43/40,585; Sept. 9, 1968, 43/64,277; Oct. 2,
1968, 43/71,153; Oct. 9, 1968, 43/73,174; Oct.
12, 1968, 43/74,449
Int. Cl. G03g 5/04
U.S. Cl. 96—1.8
1 Claim

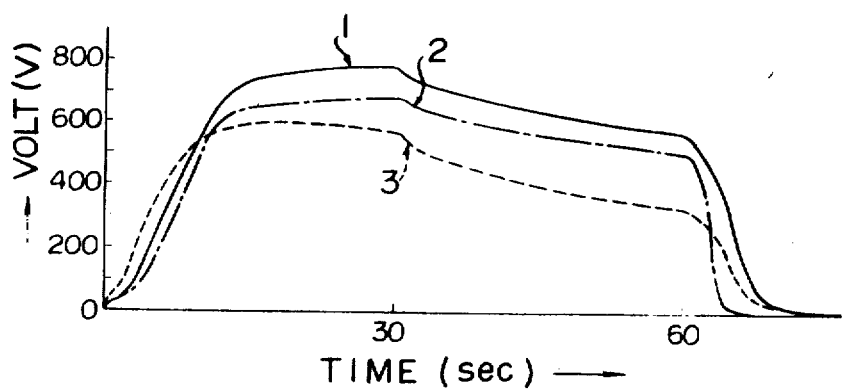

ABSTRACT OF THE DISCLOSURE

An electrophotographic copying material having a photoconductive layer formed on the surface of a support, whose back is pre-coated with an electroconductive layer, with an intermediary layer between said photoconductive layer and the support, said intermediary layer comprising a printing-durable polymer consisting of (a) the reaction product of at least one member selected from the group consisting of a film-forming polyhydroxy compound and water-soluble protein, and glyoxal, (b) methylol starch, (c) vinyl polymer containing methylol starch, (d) the reaction product of a vinyl polymer, a polymer having urethane bonds and a water-soluble amino resin, (e) the reaction product of at least one member of the film-forming polymer group consisting of vinyl polymer having a reactive functional group, a derivative of cellulose and starch and at least one member of the ethylene-type vinyl monomer capable of polymerization and condensation group consisting of methylol acrylamide, acrylic acid, methacrylic acid, vinyl monomer having an epoxy group and vinyl monomer having a hydroxyl group and (f) the reaction product of a polymer having epoxy groups and at least one member selected from the bridge-making agent group consisting of water-soluble amino resin, amino compound, dibasic acid and acid anhydride.

BACKGROUND OF THE INVENTION (1) Field of the invention

The present invention relates to an electrophotographic copying material suitable for both the wet-developing process and the dry-developing process, which has a photoconductive layer formed on the surface of a support, whose back is precoated with an electroconductive layer, with an intermediary layer between said photoconductive layer and the support, said intermediary layer comprising a printing-durable polymer consisting of the reaction products between the vinyl-monomer, epoxy compound, cellulose, etc. as stated above.

(2) Description of the prior art

The conventional electrophotographic copying material employed for an offset printing plate in the prior art has been prepared using a paper or fibrous support, one side of which is previously processed for electroconductivity, which is provided with an intermediately layer formed by means of coating the opposite side thereof with a resin solution such as polyvinyl alcohol, polyvinyl acetate, etc., and the surface of thus formed intermediary layer is further coated with a dispersant consisting of a photoconductive substance such as zinc oxide and the like, a resinous binder such as acryl resin, alkyd resin and the like, and a sensitizer, whereby forming a photoconductive layer. In order to obtain an offset printing plate by employing a copying material as above, the surface of said photoconductive layer is first electrified with corona discharge, and then an original optical image is exposed onto thus electrified surface to thereby form an electrostatic latent image, and subsequently a copied image is formed through either a dry-developing process or a wet-developing process, and lastly the non-image areas are made hydrophilic by means of a treating solution containing inorganic and organic ions.

During the foregoing copying process, the electric potential impressed on the photoconductive layer is required not to easily decay by virtue of obstruction by an intermediary layer as well as the support. Such phenomenon of the potential decay, that is, the so-called "dark decay" is much influenced by the electric efficiency of the intermediary layer—such as electric insulating property, ion property, etc.—as well as physical and chemical efficiency such as hydroscopicity and the like, while, at the time of exposure said electric potential is required to decay rapidly. The characteristic curve of said dark decay is desired to be almost even regardless of the normal humidity or a high humidity and deterioration thereof under a high humidity be as little as possible. Therefore, the back of a copying material is coated with an electroconductive substance such as polyvinylbenzyltrimethylammoniumchloride or other surfactant so as to facilitate the escape of electric charge therefrom. As to the process of making hydrophilic, inasmuch as a treating solution can easily permeate through the photoconductive layer up to the intermediary layer, so that said intermediary layer is required to have a sufficient water-resisting property as well as interlayer- or wet-adhesive property. Should a photoconductive layer fail to meet these requirements, it will result in easy exfoliation in the course of offset printing. As to the manufacturing process of a copying material on the other hand, inasmuch as the surface of an intermediary layer is to be coated with a photoconductive-layer-forming dispersant (which employs water or an organic solvent such as toluene, etc. as a dispersion medium), said intermediary layer is required to have an adequate solvent-resisting property and smoothness of the surface thereof. (Clay is ordinarily employed as surface-smoothing agent.) Since the copying efficiency (viz. image formability) of a copying material provided with an intermediary layer and the printability of said material when employed for an offset printing plate need to meet such requirements as stated above, selection of a material suitable for said inter-layer is a matter of great importance.

However, none of the conventional electrophotographic copying materials has been provided with an intermediary layer capable of satisfying all of these requirements. That is, for instance, a copying material employing such a resin as polyvinyl alcohol, polyvinyl acetate, etc. has been attended with defects in respect of water-resisting property, solvent-resisting property, adhesive property or printing endurance thereof and, consequently, has been inadequate as an offset printing plate for use in voluminous printing. Therefore, varieties of proposals have so far been made with a view to remedying these defects. Typical proposals in this sphere are relevant to for instance, a copying material having an adhesive layer sandwiched in between the intermediary layer and the photoconductive layer (Japanese Pat. No. Showa 40–7,332) or a copying material provided with an intermediary layer consisting of a reaction product between a polymer having a reactive functional group such as a hydroxyl group, carboxyl group, etc. and an initial-stage condensate of amino resin (viz. amino-plast) such as trimethylol melamine and the like (Japanese Pat. No. Showa 40–18,708). However, in case of the former of the above cited proposals, the printability is admittedly improved to some extent, but it requires provision of three layers, to wit, an intermediary layer, an adhesive layer and a photoconductive layer and, therefore, it is not only uneconomical but also apt to give rise to lack of uniformity of efficiency, while, in case of the latter, it has such a drawback that the residual formaldehyde within the intermediary layer is apt to volatilize to thereby decompose the sensitizer (viz. a dye) contained in the photoconductive layer or give rise to a change of quality of said photoconductive layer with the lapse of time to thereby cause deterioration of preservability as well as degeneration of the electrostatic properties and printability thereof.

SUMMARY OF THE INVENTION

The present invention provides an electrophotographic copying material having an improved intermediary layer, with a view to elimination of the above stated shortcomings of the copying materials in the prior art and also provision of a copying material having superb electrostatic properties as well as printing endurance suitable for the offset printing plate.

As for the intermediary layer according to the present invention, such composites combining various materials as follows are applicable.

Composite A.—This composite comprises the reaction products between at least one member selected from the group consisting of a film-formable poly-hydroxy compound and a water-soluble protein and glyoxal. Said film-formable polyhydroxy compound means polyvinyl alcohol, starch, carboxymethyl cellulose, hydroxyethyl cellulose or the denatured substances thereof (for instance, methylol-starch or amido-starch), while said water-soluble protein means such vegetable or animal glue as casein, gelatin, albumin, fish glue, or the denatured substances thereof (for instance, milk casein, egg albumin, etc.). Further, in order to improve the flexibility of said intermediary layer, some plastic substance may be added to said reaction products as occasion calls. As for said plastic substance, any one of such polyhydroxy compound as glycerol, ethylene glycol, etc., water-soluble latex or lacquer such as acryl lacquer, alkyd lacquer, acryl latex, vinyl acetate latex and butadiene latex, and other water-soluble or water-dispersive resin such as vinyl methyl ether-vinyl ethyl ether-maleic anhydride copolymer or ester thereof, vinyl acetate-crotonic acid copolymer as modified to be water-soluble, is suitable.

As for the process of forming an intermediary layer according to the present invention, 0.02–0.5 part by weight—preferably less than 0.4 part by weight—of glyoxal 1 part by weight of a film-formable polyhydroxy compound, a water-soluble protein or a mixture of them, are mixed together, and, subsequently, thus prepared mixture is dispersed in a proper quantity of water. The resultant dispersant is then coated on a support by way of the known spray-drying process to be followed by about 2 to 3 minutes drying at a temperature in the range of 120–140° C. In the processes as above, there take place complex bridge-making reactions among said materials, resulting in providing said film-formable substance with non-water-soluble property.

For instance, in case of the reaction between PVA and glyoxal, there seems to be a bridge-making reaction going on within water as follows. In this connection, it is noted that said glyoxal

is in a state of perfect balance with a hydrate to be expressed by

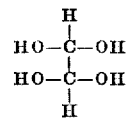

in the presence of water.

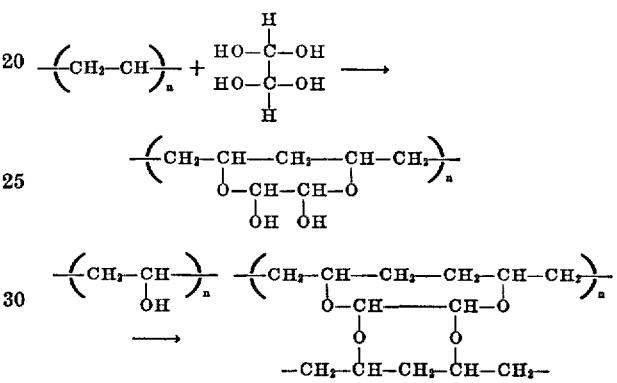

The foregoing film-formable polyhydroxy compound or water-soluble protein may be converted to a water-insoluble substance by virtue of borax, colloidal silica and the like, too. But, the inventors of the present invention have come to the conclusion, as a result of a series of experiments and especially practical uses for printing, that glyoxal is the most effective substance of all. In other words, in case where borax, colloidal silica or the like is employed, a sufficient water-resisting property cannot be obtained and there takes place a partial exfoliation of the photoconductive layer during the printing so that a copying material prepared by employing these substances can hardly be of practical use.

Composite B.—This composite comprises methylol-starch. As for said methylol-starch, such one as prepared according to a method comprising for example, mixing an aqueous solution of starch with 0.1–5 weight percent of a basic catalyst based on water in starch solution to adjust pH 7, adding 1–40 weight percent of N-methylol acrylamide into the mixture, maintaining 20–60° C. for 0.5–2 hours and neutralizing the product with an acid, is applicable, but is not necessarily limited thereto. As to the commercially available methylol-starch, a manufacture of Soken Chemical Co. Ltd. sold under the name "WS–120" is suitable.

Methylol-starch has a superb water-resisting property. To take an illustration, a coating film formed through the steps of adding 0.1 part by weight of ammonium chloride per 10 parts by weight of methylol-starch to prepare an aqueous solution, coating thus obtained aqueous solution on a paper support and drying thereafter for 3 minutes at the temperature of 130° C., proves to be no longer water-soluble. Not only that, a coating film thus formed is also excellent in its flexibility.

Furthermore, for the sake of accelerating the bridge-making reaction, a bridge-making catalyzer such as ammonium chloride, salts of oragnic amine or the like may be also added to an intermediary-layer forming solution.

Besides, in order to improve the adhesive property of the present composite towards the photoconductive layer, an emulsion containing a vinyl polymer may be added to said methylol-starch to the extent of 10–60 parts by weight thereof. As for such vinyl polymer emulsion, either of the non-reactive emulsion and the reactive emulsion having a reactive functional group will do. Such vinyl polymer emulsion includes, for example, acryl resin, polyvinyl acetate, polyvinyl chloride, polyvinylidene chloride, etc.

Composite C.—This composite comprises the reaction products among a vinyl polymer, a polymer having an urethane bond and a water-soluble amino resin.

Said vinyl polymer means, for example, a polymer or a copolymer comprising monomers having a polymerizing vinyl radical such as acrylic ester, methacrylic ester, acrylonitrile, styrene, vinyl chloride, vinylidene choride, vinylidene acetate, vinyl acetate, ethylene, butadiene, etc. or a polymer or a copolymer produced by reaction between at least one member of the foregoing monomers having a polymerizing vinyl radical and at least one member of such monomers as acrylic acid, methacrylic acid, maleic acid, succinic acid, itaconic acid, glycidic acid, other carboxylic acid as well as acid anhydrides thereof, glycidyl methacrylic acid, hydroxyethylacrylic acid, hydroxypropylacrylic acid or esters thereof, vinyl amide formate and the group of amines such as primary amine, secondary amine, tertiary amine, etc., said polymer or copolymer having one or more radicals of carboxyl group, alkoxycarbonyl group, amino group, amido group, hydroxyl group, alkoxyl group, epoxy group and cyano group.

The aforesaid polymer having an urethane bond means one or more polymers selected from methylol urethane polymers and other modified urethane polymers, and said methylol urethane polymer includes, for instance, a partial-methylolurethane polyvinylalcohol (manufactured by Toyo Koatsu Kogyo Co., Ltd. and sold under the names "Uramine-XP 72," "Uramine-T 1000," "Uramine-T 1050" and Uramine-XP 66") which is obtained by denaturing polyvinyl alcohol into urethane. There being some commercially available polymers containing water-soluble amino resin as above, it may be advisable to utilize them for the present invention. A partial-methylolurethane polyvinyl alcohol has a methylol group bonded at the end of its structural formula, so that it has plenty of reactivity as compared with an ordinary polyvinyl alcohol, and is not only provided with self-bridge-making property but also capable of readily reacting against vinyl polymer and water-soluble amino resin. Moreover, the reaction products thereof have complex network structures and, consequently, are excellent in water resistance as well as solvent resistance. The foregoing water-soluble amino resin means alkylated melamine-formaldehyde resin such as melamine or dimethylol melamine, trimethylol melamine, etc., urea-formaldehyde resin, aniline-formaldehyde resin, cyanamide-formaldehyde resin or mixtures of these resins. According to the present invention, mixing of quite a small amount of said amino resin suffices to effect the object thereof, and will provide the intermediary layer with an appropriate flexibility as well as a satisfactory smoothness which could not be expected of any copying material in the prior art.

In case of forming an intermediatery layer by employing the aforesaid vinyl polymer of water-dispersible quality, it is only necessary to take such steps that a film-formable dispersant is first prepared by dispersing a vinyl polymer, a polymer having an urethane bond and a water-soluble amino resin polymer in water, ammonium chloride or the like is then added to said dispersant as a bridge-making catalyzer, and the resultant solution is coated on a support and dried at 110–140° C. for 1–2 minutes subsequent thereto.

As for said dispersant for use in forming an intermediary layer, it comprises 0.1–5 parts by weight—preferably 0.1–2 parts by weight—of a polymer having an urethane bond per 1 part by weight of a vinyl polymer, and 0.05–0.5 parts by weight of a water-soluble amino resin based on the total weight of the foregoing two polymers. Further, on the occasion of forming said intermediary layer, polyvinyl acetate, thermoplastic acryl resin or the like may be jointly employed in order to further improve the flexibility as well as the adhesive property of said layer towards the photoconductive layer.

Composite D.—This composite comprises the reaction products between at least one member of the film-formable polymer group consisting of a vinyl polymer having a reactive functional group, a cellulose derivative and starch and at least one member of the ethylene-type vinyl monomer group capable of polymerization and condenzation consisting methylol acrylamide, acrylic acid, methacrylic acid, a vinyl monomer having an epoxy radical such as glycidyl methacrylate and a vinyl monomer having a hydroxyl group such as hydroxypropyl methacrylate.

The above stated vinyl polymer having said reactive functional group means, a copolymer to be produced by reactions between at least one member of such monomers having a polymerizing vinyl radical as acrylic ester, methacrylic ester, acrylonitrile, styrene, vinyl chloride, vinylidene chloride, vinyl acetate, vinylidene acetate, ethylene, butadiene, etc. and at least one member of the group of monomers comprising acrylic acid, methacrylic acid, maleic acid, succinic acid, itaconic acid, glycidic acid, other carboxylic acid as well as acid anhydrides thereof, glycidyl methacrylic acid, hydroxyethyl acrylic acid, hydroxyethyl methacrylic acid, hydroxypropyl acrylic acid, hydroxypropyl methacrylic acid or esters thereof, acrylamide, vinylamide formate and the group of amines such as primary amine, secondary amine, tertiary amine, etc., said polymer having at least one radical of carboxyl group, alkoxycarbonyl group, amino group, amide group, hydroxyl group, alkoxyl group, epoxy group and methylol group. And, said cellulose derivative means, for example, methyl cellulose, carboxymethyl cellulose, hydroxyethyl cellulose, etc.

In case of forming an intermediary layer by employing the aforesaid materials, upon dissolving or dispersing a film-formable polymer in water, an ethylene-type vinyl monomer is first added to a solution or dispersant thus prepared and is stirred thoroughly to achieve homogenization. Subsequently, an aqueous solution comprising a polymerization catalyzer such as hydrogen peroxide, potassium persulfate, ammonium persulfate, etc. and a condensation catalyzer such as an acidic salt like ammonium chloride or an organic amine salt is added, as occasion demands to the foregoing dispersant, whereby is prepared a dispersant for use in forming an intermediary layer. The composition ratio on this occasion is desirable to be 1–20 parts by weight of an ethylene-type vinyl monomer, 0.03–0.3 part by weight of a polymerization catalyzer and 0.3–6 parts by weight of a condensation catalyser per 5–10 parts by weight of a film-forming polymer such as vinyl polymer. Besides, mixing of 1–9 parts by weight of polyvinyl acetate or thermoplastic acrylic resin with said intermediary layer formable dispersant will serve to improve flexibility as well as adhesive property of the intermediary layer towards the photoconductive layer. After that, the resultant dispersant for use in forming an intermediary layer is coated on the non-electroconductive side of a support, whose surface has been processed for electroconductivity, by such a conventional means as the so-called air-doctor, and then dried for 1–2 minutes at a temperature in the range of 130–150° C. to thereby form said intermediary layer.

Composite E.—This composite comprises the reaction products between a polymer containing an epoxy group and at least one member of the bridge-making agent group consisting of a water-soluble amino resin, an amino compound, a dibasic acid and an acid anhydride.

Said polymer containing an epoxy group means a polymer comprising such monomers as glycidic acid or ester thereof, glycidyl methacrylic acid or ester thereof, etc.

or other monomers having an epoxy group— for instance, a manufacture of Nippon Oil and Fats Co., Ltd. sold under the name "Blenmer G" (which is a vinyl monomer having an epoxy group)—and one or more than two of such compounds capable of copolymerizing with an epoxy group as styrene, acrylic acid or ester thereof, methacrylic acid or ester thereof, acrylonitrile, vinyl chloride, vinylidene chloride, vinyl acetate or ethylene. However, it goes without saying that a polymer containing an epoxy group according to the present invention is not necessarily limited to the one produced by the foregoing process of preparation. As for the water-soluble amino resin, the same resin as that of the aforesaid composite C is employed. It is an initial-stage condensate compound of amino resin such as melamine-formaldehyde resin, urea-formaldehyde resin, etc. and includes dimethylol melamine, trimethylol melamine, dimethyl-trimethylol melamine, urea-formalin, etc. And, said amino compound means the group of amines such as ethylene diamine, diethylene triamine, diethylaminopropyl amine, m-phenylene diamine, etc. or a polyamine such as a copolymer of acrylic amide and ethyl acrylate. Further, said dibasic acid means, for example, oxalic acid, succinic acid, etc., and the acid anhydride means the anhydride of dicarboxylic acid such as phthalic anhydride, succinic anhydride, etc. Any of these substances may be employed as a bridge-making agent, and the composition ratio is in the range of 0.001–0.2 part by weight thereof per 1 part by weight of the aforesaid polymer.

The above-stated polymer containing an epoxy group which constitutes the intermediary layer is prepared, for instance, by heating and polymerizing methyl methacrylate and glycidyl methacrylate in the presence of a radical catalyzer such as ammonium persulfate, a nonion-type emulsifier such as sodium lauryl benzenesulfonate, sodium dodecyl benzenesulfonate, etc. and a stabilizer such as polyvinyl alcohol. Thus obtained reactive polymer containing an epoxy group is employed, together with the above elucidated bridge-making agent such as an initial-stage condensate of amino resin, an amino compound, etc. as well as a catalyzer and, if necessary, an electroconductive agent, for preparing a dispersant. The resultant dispersant is then coated on the surface of a support and is dried to thereby form an intermediary layer on said support. Thus formed intermediary layer is therefore presumably provided with complex network structures by virtue of the bridging between the foregoing materials.

Subsequently, by means of coating a photoconductive-layer forming dispersant comprising such well-known materials as zinc oxide, resinous binder, sensitizer and so on the surface of an intermediary layer provided as above, a photoconductive layer is formed and an electrophotographic copying material is obtained. In case where any such a support as has not been processed for electroconductivity is to be employed, it will suffice to coat one side of said support with a electroconductive-layer-formable dispersant comprising the above-stated intermediary-layer-forming dispersant, an electroconductive agent and, if necessary, a surface-smoothing agent, to thereby form an electroconductive layer on the support.

Inasmuch as electrophotographic copying material thus obtained according to the present invention is provided with an intermediary layer having network structures as stated above, it features in that not only its water-resisting qualities, solvent-resisting qualities and durability are much improved, but also its dark-decay properties are by no means affected, and, as a result a clear-cut copied image can be expected therefrom. Furthermore, it demonstrates a superb durability when employed for an offset printing plate so that a stable mass-printing can be effected thereby.

BRIEF DESCRIPTION OF THE DRAWING

The accompanying figure is a graph showing the respective dark-decay properties of a copying material according to the present invention which is provided with an intermediary layer comprising the foregoing Composite C and copying material for comparison's sake.

DESCRIPTION OF THE PREFERRED EMBODIMENTS

Example 1

One side of a paper support weighing 70 g./m.$^2$ was processed for electroconductivity and the opposite side thereof was coated (amount of coating: 129 g./m.$^2$) with a dispersant for use in forming an intermediary layer, which consists of:

|  | G. |
|---|---|
| Acryl latex (a manufacture of Nippon Acryl Mfg. Co., Ltd., sold under the name "Primal–HA 16") | [1] 80 |
| Polyvinyl alcohol (a manufacture of Kurashiki Rayon Co., Ltd., sold under the name "Polval 117") | [1] 120 |
| Glyoxal | 60 |
| Water | 1,400 |

[1] In the terms of solid matter.

and then dried for 2 minutes at 120° C., whereby was formed an intermediary layer. Then, the surface of thus formed intermediary layer was coated with a photoconductive-layer forming dispersant consisting of:

|  | G. |
|---|---|
| Photoconductive zinc oxide | 500 |
| Silicone resin (a manufacture of Shin-Etsu Kagaku Co., Ltd., sold under the name "KR 211") | 50 |
| Acryl resin (a manufacture of Toa Gosei Co., Ltd., sold under the name "Aron 1003") | 50 |
| Fluorescene | 0.01 |
| Rose Bengal | 0.01 |
| Toluene | 600 | and was dried, whereby was prepared an electrophotographic copying paper.

Subsequently, thus prepared copying paper was employed for copying by means of an electrophotographic copying press (viz. a manufacture of Kabushiki Kaisha Ricoh, sold under the name "S–1") under different conditions, namely, low humidity (40% R.H.), normal humidity (65% R.H.) and high humidity (85% R.H.), and, as a result, a clear-cut copied image was obtained respectively. After thermal fixing of said image, the non-image area of the photoconductive layer was made hydrophilic by means of a treating solution comprising phosphoric acid, potassium ferrocyanide, polyacrylic acid and water, whereby was prepared an offset printing plate. Said offset printing plate, when employed for printing by an offset-printing machine (viz. a manufacture of Kabushiki Kaisha Ricoh, sold under the name "Offset 1000"), could produce more than 3000 prints of stable clearness. On the other hand, by employing a commercial electrophotographic copying paper provided with an intermediary layer consisting of PVA-starch type substance and a commercial copying paper provided with an intermediary layer consisting of water-soluble acrylic lacquer and PVA, an offset-printing plate (consisting of the same materials for the support and the photoconductive layer, respectively, as that of the present example) was prepared respectively. Either of these printing plates, when employed for printing in the same way as that of the present invention, showed an inferior copying efficiency under high humidity and disclosed such drawbacks as partial exfoliation of the photoconductive layer or occurrence of cracks prior to producing 3000 prints.

Example 2

One side of a paper support weighing 50 g./m.$^2$ was processed for electroconductivity and the opposite side thereof was coated (amount of coating: 8 g./m.² with a dispersant consisting of:

| | G. |
|---|---|
| Polyvinyl alcohol | 98 |
| 40%-aqueous solution of glyoxal | 40 |
| Vinylmethylether-maleic anhydride copolymer (a manufacture of Mitsubishi Kasei Co. Ltd. sold under the name "PVM/MA") | 2 |
| Water | 1,000 | and then dried for 2 minutes at 130° C., whereby was formed an intermediary layer. Then, the surface of thus formed intermediary layer was coated with a photoconductive-layer forming dispersant consisting of:

| | |
|---|---|
| Photoconductive zinc oxide g— | 500 |
| Acryl-denatured alkyd resin (a manufacture of Dainippon Ink Mfg. Co., Ltd., sold under the name "ODA–109") g— | 80 |
| Styrene-butadiene copolymer (a manufacture of Esso Standard Oil Co., Ltd., sold under the name "Buton 100") g— | 20 |
| Rose Bengal mg— | 5 |
| Tetrabromophenol Blue mg— | 6 |
| Toluene g— | 700 | and was dried, whereby was prepared an electrophotographic copying paper.

Thus, prepared copying paper, when empolyed for copying in the same way as in Example 1 under such high humidity as 85% R.H. and at a temperature of 30° C., it displayed an image concentration of about 1.5. Meanwhile, in case of a conventional copying paper having the same support and photoconductive layer which was employed for copying in the same way as above for the sake of comparison, the image concentration was about 1.0 and, consequently, the copying paper of the present invention proved superior in this respect. This fact was also substantiated by the findings resulting from a survey of dark-decay factors. That is to say, the dark-decay factor under high humidity in case of said copying paper for comparison's sake was in the range of 30–40%, whereas in case of the copying paper of the present invention it was 15%, to wit, by far lower than the former. Besides, in case of practical use for offset printing, the photoconductive layer of the copying paper for comparison's sake came off upon producing 100 prints whereas the one according to the present invention could produce stable prints of more than 3,000.

Example 3

By employing a couple of paper supports whose back had been processed for electroconductivity respectively while one of said supports had been provided with such an intermediary layer as Example 1 above and the other provided with such an intermediary layer as Example 2 above, a photoconductive-layer-forming dispersant prepared by dispersing 100 g. of photoconductive zinc oxide, 200 g. of a highly insulating acryl latex (viz. 10% aqueous solution of a compound named Goseran, a manufacture of Nippon Gosei Co., Ltd.), 1 mg. of Rose Bengal and 1 mg. of fluorescene in 1,000 g. of water was coated on the surface of respective intermediary layer and was dried, to thereby prepare two kinds of electrophotographic copying papers.

On the other hand, another electrophotographic copying paper for the purpose of comparison was prepared by employing a paper support provided with an intermediary layer consisting of the conventional polyvinyl alcohol and an initial-stage condensate consisting of trimethylol melamine and coating the surface of said intermediary layer with the foregoing dispersant.

Subsequently, the copying papers according to the present invention and the copying paper for comparison's sake were compared with respect to the copying efficiency under high humidity, and, as a result, it was confirmed that the copying papers of the present invention were by far superior to the copying paper used for comparison's sake, and, not only that, said copying efficiency was almost the same as in case of normal humidity.

Example 4

An intermediary-layer-forming despersant consisting of:

| | G. |
|---|---|
| Denatured acryl latex (a manufacture of Toa Gosei Co., Ltd., sold under the name "Alon 4001") | [1] 100 |
| Polyvinyl alcohol | 160 |
| Gelatin | 40 |
| 40% aqueous solution of glyoxal | 50 |
| Water | 2,500 |

[1] In terms of solid matter.

was coated to the extent of 12 g./m.² or thereabout on one side of a tempered paper support whose pulp ratio of N/L was 1/1 and the opposite side of which had been processed for electroconductivity, and then was dried for 3 minutes at 130° C. to thereby provide an intermediary layer. Subsequently, the same photoconductive-layer-forming dispersant as that employed in Example 1 above was coated on the surface of said intermediary layer and was dried to thereby prepare an electrophotographic copying paper. Thus obtained electrophotographic copying paper was then employed for preparing an offset-printing plate by processing in the same way as in case of Example 1, and the resultant printing plate, when employed for practical use, could produce stable prints of more than 8,000. Besides, the copying efficiency proved stable regardless of such conditions as normal humidity or high humidity.

Example 5

An intermediary-layer-forming dispersant consisting of 100 parts by weight of 20%-aqueous solution of methylol starch (viz a manufacture of Soken Chemical Co., Ltd. sold under the name "WS–120") and 0.2 part by weight of ammonium chloride added thereto and stirred well, was coated to the extent of 13 g./m.² in terms of resin on one side of a paper support—the same as that of Example 4—whose opposite side has been processed for electroconductivity, and then was dried for 3 minutes at 140° C. to thereby provide an intermediary layer. Subsequently, the same photoconductive-layer-forming dispersant as that employed in Example 1 above was coated on the surface of said intermediary layer and was dried to thereby prepare an electrophotographic copying paper. Thus obtained electrophotographic copying paper could produce an excellent image having a good contrast, and, in case where it was employed for preparing an offset-printing plate, said plate could produce stable prints of more than 2,000.

Example 6

An intermediary-layer-forming dispersant was prepared by means of adding 100 parts by weight of a polyvinyl acetate emulsion manufactured by Hoechst Gosei Co., Ltd., and sold under the name "Movinyl 144" (which contains 45% resin), 200 parts by weight of 50%-aqueous solution of methylol starch (a manufacture of Soken Chemical Co., Ltd. sold under the name "WS–120") and 14 parts by weight of 10%-aqueous solution of ammonium chloride to 200 parts by weight of water and thoroughly stirring the mixture for homogeneous dispersion. Thus prepared intermediary-layer-forming dispersant was then coated on the surface of a support consisting of a slick paper (pulp ratio of N/L being 50/50), the back of which has been processed for electroconductivity, by means of an air-doctor, and, subsequent to drying for 1 minute at 150° C., was subjected to super-calendering, whereby was formed an intermediary layer on said support. The amount of adhesion of the resultant intermediary layer was about 10 g./m.² in terms of the solid matter.

Meanwhile, a photoconductive-layer-forming dispersant was prepared by means of adding 100 parts by weight of zinc oxide, 30 parts by weight of acryl resin (containing 50% of resin), 10 parts by weight of silicone resin (containing 50% of resin) and 2.5 parts by weight of methanol solution containing 50% of Rose Bengal to 140 parts by weight of toluene and thoroughly dispersing them to effect homogenization. Subsequently, thus obtained dispersant was coated on the surface of the foregoing intermediary layer formed on the support and was dried for 2 minutes at 120° C. to thereby form a photoconductive layer of 12μ thick, whereby an electrophotographic copying material was obtained.

An electrophotographic copying material thus prepared demonstrated a superb electrification property and, in particular, the dark decay under high humidity was small, so that in either case of dry development and wet development the image produced thereby displayed a superb contrast and has a superior durability. Besides, said electrophotographic copying material did not show any crack or exfoliation of its photoconductive layer even though it was bent or folded. And, a copy obtained through dry developing a copying material under the present invention, when employed as an offset-printing plate, was never eroded by etching liquid or immersion water, nor showed any deformation or damages even after producing 4,000 prints.

Example 7

An intermediary-layer-forming dispersant was prepared by means of adding 100 parts by weight of a self-bridging type acryl emulsion (viz a manufacture of Nippon Acryl Chemical Co., Ltd. sold under the name "Primal–HA 16" containing 45% of resin), 44 parts by weight of polyvinyl acetate emulsion (containing 45% of resin), 130 parts by weight of 50% aqueous solution of methylol starch which is the same as that employed in Example 1 above, 5 parts by weight of 40% aqueous solution of macromolecular quaternary ammonium salt (viz a manufacture of Cargon Corporation, sold under the name "Conductive Polymer 261") and 14 parts by weight of 10% aqueous solution of ammonium chloride to 25 parts by weight of water and thoroughly stirring for dispersion. Subsequently, thus obtained intermediary-layer-forming dispersant was coated on the surface of a support which is the same as that employed in Example 1 above and, upon drying for 1 minute at 150° C., was subjected to super-calendering, whereby an intermediary layer was formed on said support. Then, a photoconductive-layer-forming dispersant having the same composition as that of Example 6 was coated on said intermediary layer formed on the support and was dried to form a photoconductive layer of 11μ thick, whereby was prepared an electrophotographic copying material. The efficiency of thus obtained copying material proved equivalent to that of the copying material obtained in the foregoing Example 6. Besides, said electrophotographic copying material, when applied to an offset-printing plate, did not show any deformation nor damages even after producing 5,000 prints.

Meanwhile, in case of an electrophotographic copying material prepared for the sake of comparison through quite the same operations as the present example except for replacement of methylol starch employed therefor by corn starch, an offset-printing plate prepared by employing said copying material showed occurrence of cracks and exfoliation of photoconductive layer upon producing about 500 prints and proved unsuitable for mass-printing.

Example 8

An intermediary-layer-forming dispersant consisting of:

| | Parts by weight |
|---|---|
| Self-bridging type acryl resin emulsion (a manufacture of Nippon Acryl Chemical Industries Co., Ltd., sold under the name "HA 16," containing 45% of resin) | 100 |
| Acrylic ester emulsion (Primal–AC 22, containing 45% of resin) | 42 |
| Partial-methylolurethane, polyvinyl alcohol (a manufacture of Toyo Koatsu Industrial Co., Ltd. sold under the name "Uramin–XP 66," containing 10% of resin) | 450 |
| Ammonium chloride | 1.1 |
| Water | 300 | was coated on the surface of a slick paper (pulp ratio of N/L being 50/50) by means of an air doctor and was dried for 1 minute at 140° C., whereby an intermediary layer of 6μ thick was formed.

Subsequently, an electroconductive-layer-forming dispersant consisting of:

| | Parts by weight |
|---|---|
| Self-bridging type acryl resin emulsion | 100 |
| Partial-methylolurethane polyvinyl alcohol (a manufacture of Toyo Koatsu Industrial Co., Ltd., sold under the name "Uramin–XP 66") | 90 |
| Urea-formalin resin (named "Uramin–P 2200") | 11 |
| Polyvinylbenzyl-trimethylammonium chloride (containing 30% of resin) | 10 |
| Ammonium chloride | 1 |
| Water | 300 | was coated on the back of the foregoing slick paper support and was dried for 1 minute at 140° C., whereby an electroconductive layer was formed on said support. Both the intermediary layer and the electroconductive layer formed as above proved to be a perfect resin film having a smooth surface free of any flaw or pinhole.

Next, a photoconductive-layer formable acryl resin was prepared by causing a mixture comprising 50 parts by weight of styrene, 47 parts by weight of butyl acrylate, 3 parts by weight of acrylic acid and 100 parts by weight of toluene to react for 10 hours at 100° C. Then, a dispersant was prepared by dispersing 40 parts by weight of said acrylic resin, 100 parts by weight of zinc oxide and 2 cc. of 5% methanol solution of Rose Bengal in 150 parts by weight of toluene, and was coated on the surface of the foregoing intermediary layer of the support and dried for 1 minute at 150° C. to thereby form a photoconductive layer of 12μ thick, whereby a desired electrophotographic copying material was obtained.

After that, the surface of thus formed photoconductive layer of said copying material was subjected to corona discharge under the conditions of 32° C. and a relative humidity of 80% to impart a saturated potential, and, after 30 seconds, the electrified surface was exposed to light and the dark-decay characteristic curve was sought.

On the other hand, an electrophotographic copying material for use in comparison was prepared in just the same way as the present example except that the principal components of the intermediary layer and electroconductive layer thereof were replaced by the reaction products between the initial-stage condensate consisting of dimethyl-trimethylol melamine resin and styrene-hexyl acrylate-acrylonitrile, and the dark decay characteristic curve was sought under the same conditions. The results of experiments as above were as shown in the accompanying diagram. In said diagram, curve 1 shows the characteristic in case of the present example, while curve 3 shows the characteristic in case of the comparative material. (Curve 2 shows the characteristic in case of Example 8.) As may be understood from said diagram, the copying material under the present invention is provided with a saturated potential higher than that of said material employed for comparison's sake, the decrement of the dark decay characteristic curve thereof is slight, and the sensitivity thereof is very high. Accordingly, the copied image obtained through dry development as well as wet development of a copying material of the present invention was very clear. Furthermore, in case where the copied image obtained through dry development was employed for an offset-printing plate, it was never eroded by etching liquid or immersion water, and could turn out quite stable prints of image even after producing more than 10,000 prints.

Example 9

(a) A mixture comprising:

| | Parts by weight |
|---|---|
| Methyl methacrylate | 60 |
| Ethyl acrylate | 45 |
| Acrylamide | 2 |
| Glycidyl methacrylate | 3 |
| Ammonium persulfate | Small amount |
| Sodium laurylbenzene sulfonate | Small amount |
| Hydroxyethyl cellulose | Small amount |
| Water | 100 | was caused to react for 6 hours at 120° C., whereby a vinyl-polymer emulsion was prepared. Subsequently a dispersant was prepared by dispersing 100 parts by weight of said emulsion, 500 parts by weight of partial-methylolurethane polyvinyl alcohol solution (a manufacture sold under the name "Uramin–T 1000," containing 10% of resin), 40 parts by weight of thermoplastic acryl resin emulsion (a manufacture sold under the name "Primal–AC 22," containing 50% of resin), 8 parts by weight of melamine-formaldehyde resin (a manufacture of Sumitomo Chemical Co., Ltd., sold under the name "Sumirez Resin 613") and 1.4 parts by weight of ammonium chloride to 100 parts by weight of water. Thus prepared dispersant was then coated on one side of a slick paper (pulp ratio of N/L: 50/50, thickness: 120μ) by means of an air-doctor and was dried for 1 minute at 140° C., whereby was formed an intermediary layer of 6μ thick.

Next, another dispersant was prepared by dispersing 100 parts by weight of the emulsion obtained through the process as set forth under (a) above, 90 parts by weight of the foregoing partial-methylolurethane polyvinyl alcohol solution, 5 parts by weight of the foregoing thermoplastic acryl resin emulsion, 17 parts by weight of 30% aqueous solution of polyvinylbenzyl-trimethylammonium chloride, 1.4 parts by weight of ammonium chloride, 80 parts by weight of clay and 0.3 part by weight of sodium hexamethaphosphate to 200 parts by weight of water, and thus prepared dispersant was coated on the other side (viz uncoated side) of said slick paper support in the same way as in case of forming the aforesaid intermediary layer and was dried for 1 minute at 140° C., whereby an electroconductive layer was formed. Then, the surface of said intermediary layer formed on the support was dipped for 1 hour in toluene to be employed on the occasion of forming a photoconductive layer subsequent thereto, but there was observed no change at all.

Subsequently, by means of employing the same electrophotoconductive-layer-formable dispersant and in the same way as in Example 8, a photoconductive layer of 12μ thick was formed and a desired electrophotographic copying material was prepared therefrom.

The surface of photoconductive layer of thus obtained electrophotographic copying material was subjected to corona discharge at 32° C. under the conditions of 32° C. and 80% R.H. as in case of Example 8 to seek its dark decay characteristic curve (see curve 2 of the accompanying diagram), and this obtained characteristic curve was compared with the curve 3 pertaining to the copying material employed for comparison's sake. As a result, it was found that the copying material of the present example could be provided with such a high saturated potential as in the case of Example 8 and the decrement of its dark decay characteristic curve was slight and sensitivity thereof was high. Accordingly, a copied image obtained through dry development as well as wet development of the copying material under the present invention had no stained texture and was quite clear.

Further, in case where a copied image obtained through dry development was employed for an offset-printing plate, there was observed no erosion by etching liquid or immersion water, nor any deformation or damages even after producing 10,000 prints.

Example 10

(b) A mixture comprising:

| | Parts by weight |
|---|---|
| Methyl methacrylate | 60 |
| Butyl acrylate | 30 |
| Hydroxyethyl acrylate | 10 |
| Ammonium persulfate | Small amount |
| Sodium laurylbenzene sulfonate | Small amount |
| Hydroxyethyl cellulose | Small amount |
| Water | 100 | was caused to react for 6 hours at 120° C., whereby a film-coating copolymer emulsion was prepared. Next, a dispersant was prepared by dispersing 100 parts by weight of said emulsion, 40 parts by weight of vinyl acetate emulsion (containing 50% of resin), 180 parts by weight of partial-methylolurethane polyvinyl alcohol solution (viz a solution comprising 25% of resin, and named "Uramin–XP 72") which contains urea-formalin resin (composition unkown) and 1.4 parts by weight of ammonium chloride to 100 parts by weight of water. Thus prepared dispersant was then coated on a slick paper (pulp ratio of N/L: 50/50, thickness: 120) in the same way as in Example 8 and was dried, whereby an intermediary layer of 6μ thick was formed. After than, another dispersant was prepared by dispersing 100 parts by weight of the emulsion obtained through the process as set forth under (b) above, 40 parts by weight of the foregoing partial-methylolurethane polyvinyl alcohol solution containing said urea-formalin resin, 117 parts by weight of 30% aqueous solution of polyvinylbenzyltrimethylammonium chloride, 1.4 parts by weight of ammonium chloride, 80 parts by weight of clay and 0.3 part by weight of sodium hexamethaphosphate to 200 parts by weight of water, and thus prepared dispersant was coated on the other side (viz non-coated side) of said slick paper support and was dried for 1 minute at 140° C., whereby an electroconductive layer was formed.

Then, the surface of said intermediary layer formed on the support was coated with the same photoconductive dispersant as in the case of Example 8 and was dried for 1 minute at 130° C., whereby a desired electrophotographic copying material provided with a photoconductive layer of 10μ thick was obtained.

Thus prepared copying material demonstrated almost the same characteristics as that of Example 8 and, when employed for an offset-printing plate, was stable against etching liquid as well as immersion water, and showed no deformation or damages even after producing more than 10,000 prints.

Example 11

A compound consisting of:

| | Parts by weight |
|---|---|
| 50%-emulsion of polyvinyl acetate (a manufacture of Hoechst Gosei Co., Ltd., sold under the name "Movinyl 114") | 67 |
| 10% aqueous solution of polyvinyl alcohol | 500 |
| 50% aqueous solution of methylol acrylamide (a manufacture of Toyo Koatsu Industrial Co., Ltd., sold under the name "Uramin–T 80") | 100 |
| Condensation catalyzer (a manufacture of Toyo Koatsu Industrial Co., Ltd., sold under the name "Uramin Catalyst P") | 28 |
| 5% aqueous solution of potassium persulfate | 20 | was dispersed in 100 parts by weight of water and was stirred for about 10 minutes, whereby an intermediary-layer-forming dispersant was prepared. Thus obtained dispersant was then coated, by means of an air-doctor, on the non-electroconductive surface of a slick paper (pulp ratio of N/L: 50/50, thickness: 100μ) whose back had been processed for electroconductivity, and was dried for 1 minute at 150° C., whereby an intermediary layer of about 6μ thick was formed. After that, a photoconductive-layer forming dispersant prepared by stirring and homogenizing a compound comprising 100 parts by weight of zinc oxide, 40 parts by weight of 50% toluene solution of acryl resin, 2 cc. of 5% methanol solution of Rose Bengal and 150 parts by weight of toluene was coated on the surface of said intermediary layer and was dried for 1 minute at 130° C., whereby an electrophotographic copying material provided with a photoconductive layer of 10μ thick was obtained.

Thus obtained copying material proved to have superior durability, water-resisting quality, solvent-resisting quality and inter-layer adhesive quality, and the copied image thereof formed through dry development as well as wet development was quite clear. Besides, there was observed no influence at all on the liquid developer. Further, in case where a copy obtained through dry development was employed for an offset-printing plate, there was observed no erosion by etching liquid or immersion water, nor any deformation or damages even after producing more than 4,000 prints.

Example 12

A compound consisting of:

| | Parts by weight |
|---|---|
| 45% emulsion of self-bridging type acryl resin (a manufacture of Nippon Acryl Chemical Co., Ltd., sold under the name "Primal-HA 16") | 90 |
| 45% emulsion of polyvinyl acetate | 67 |
| 10% aqueous solution of methyl cellulose (a manufacture of Shin-Etsu Chemical Co., Ltd., sold under the name "Metolose-SM") | 300 |
| 50% aqueous solution of methylol acrylamide | 140 |
| Uramin Catalyst-P | 30 |
| 5% aqueous solution of potassium persulfate | 34 | was dispersed in 100 parts by weight of water and was stirred for about 10 minutes, whereby an intermediary-layer-forming dispersant was prepared. Then, said dispersant was coated on the same slick paper as that of Example 11 in the same way as in case of forming the intermediary layer of Example 11, whereby an intermediary layer was formed. Subsequently, the same photoconductive-layer-forming dispersant as that of Example 11 was coated on said intermediary layer, whereby an electrophotographic copying material was obtained. The efficiency of thus prepared copying material proved equivalent to that of Example 11, and in case where said copying material was employed for printing as an offset-printing plate, it could produce stable prints of more than 6,000.

Example 13

A copolymer comprising:

| | Parts by weight |
|---|---|
| Methyl methacrylate | 55 |
| Ethyl acrylate | 45 |
| Glycidyl methacrylate | 3 |
| Acrylamide | 2 | was employed for preparing 40% aqueous emulsion. Subsequently, a compound comprising:

| | Parts by weight |
|---|---|
| 40% aqueous emulsion prepared as above | 100 |
| 45% emulsion of polyvinyl acetate | 67 |
| 10% aqueous solution of hydroxyethyl cellulose (a manufacture of Nippon Soda Co., Ltd., sold under the name "AL-15") | 300 |
| Acrylic acid (a manufacture of Toa Gosei Co., Ltd.) | 70 |
| Uramin catalyst-P | 34 |
| 5% aqueous solution of potassium persulfate | 34 | was dispersed in 100 parts by weight of water and was stirred for about 10 minutes, whereby an intermediary-layer forming dispersant was prepared. Then, said dispersant was coated on the same slick paper as that of Example 11 in the same way as in case of forming the intermediary layer of Example 11, whereby was formed an intermediary layer. Subsequently, the same photoconductive-layer forming dispersant as employed in Example 11 was coated on the surface of said intermediary layer and was dried for 1 minute at 135° C., whereby an electrophotographic copying material provided with a photoconductive layer of 10μ thick was obtained. The copying material demonstrated characteristics equivalent to that of the preceding examples, and in case where said copying material was employed for printing as an offset-printing plate, a stable turnout of more than 4,000 prints was effected.

Example 14

A compound comprising:

| | Parts by weight |
|---|---|
| 45% emulsion of self-bridging type acryl resin | 90 |
| 45% emulsion of polyvinyl acetate | 67 |
| 10%-aqueous solution of polyvinyl alcohol (a manufacture of Kurashiki Rayon Co., Ltd., sold under the name "PVA 117") | 300 | was dispersed in 100 parts by weight of water and was stirred continuously. Meanwhile, another dispersant, which was prepared by dispersing a compound comprising 70 parts by weight of vinyl polymer containing an epoxy group (viz a manufacture of Nippon Oil and Fat Co., Ltd. sold under the name "Blenmer-G") and 2.1 parts by weight of an emulsifier (viz a manufacture of Kao Soap Co., Ltd., sold under the name "Emulgen 935") in 70 parts by weight of water, was added to the previous dispersant and was stirred for 10 minutes more to thereby prepare an intermediary-layer-forming dispersant. Thus obtained dispersant was then coated on the same slick paper as that of Example 1 in the same was as in case of forming the intermediary layer of Example 1, whereby was formed an intermediary layer of 6μ thick. Subsequently, the same photoconductive-layer forming dispersant as employed in Example 1 was coated on the surface of said intermediary layer in the same way as said example, whereby an electrophotographic copying material provided with a photoconductive layer of 12μ thick was obtained. Thus prepared copying material demonstrated characteristics equivalent to that of the preceding examples, and in case where said copying material was employed for printing as an offset-printing plate, a stable turnout of more than 4,000 prints was effected.

Example 15

By means of applying the same material and method as that of Example 14 except that the vinyl monomer containing an epoxy group employed for Example 14 was replaced by a vinyl monomer containing a hydroxyl group (viz a manufacture of Nippon Oil and Fat Co., Ltd., sold under the name "Blenmer-P"), an electrophotographic copying material was prepared. Thus prepared copying material demonstrated characteristics equivalent to that of Example 11, and in case where said copying material was employed for printing as an offset-printing plate, a stable turnout of more than 4,000 prints was effected.

Example 16

(c) A mixture comprising:

| | Parts by weight |
|---|---|
| Methyl methacrylate | 70 |
| Butyl laurate | 30 |
| Glycidyl methacrylate | 15 |
| Ammonium persulfate | Small amount |
| Sodium laurylbenzene sulfonate | Small amount |
| Hydroxyethyl cellulose | Small amount |
| Water | 120 | was caused to react for 6 hours at 80° C., whereby an epoxy resin was prepared. A dispersant was then prepared by dispersing 100 parts by weight of said epoxy resin, 10 parts by weight of dimethylol melamine and 3 parts by weight of ammonium chloride in 100 parts by weight of water, and was coated on one side of a slick paper (pulp ratio of N/L: 50/50, thickness: 65μ) by means of an air-doctor and was dried for 1 minute at 150° C., whereby an intermediary layer was formed on the surface of said paper support.

Subsequently, another dispersant was prepared by dispersing 100 parts by weight of said epoxy resin prepared by using the above (c), 50 parts by weight of 20% aqueous solution of polyvinyl alcohol, 15 parts by weight of dimethylol melamine, 3 parts by weight of ammonium chloride, 100 parts by weight of clay, 0.3 part by weight of sodium hexamethaphosphate and 20 parts by weight of polyvinylbenzyl-trimethylammonium chloride in 500 parts by weight of water, and was coated on the noncoated side of said paper support in the same way as in case of forming the foregoing intermediary layer and was dried for 1 minute at 150° C., whereby an electroconductive layer was formed on the back of said support.

The amount of resin contained in the both coating-layers of resin was 7 g./m.$^2$ for the intermediary layer and 10 g./m.$^2$ for the electroconductive layer, respectively, and the surfaces of both layers, having no pinhole or flaw thereon, were quite smooth, and the resultant support was covered with a perfect resin film. Further, in case where the intermediary layer side of the support was immersed for 1 hour in toluene which is employed in the subsequent photoconductive-layer-forming process, but there was observed no change at all.

Next, a photoconductive-layer-forming acryl resin was prepared by causing a mixture comprising 45 parts by weight of styrene, 22 parts by weight of butyl acrylate, 30 parts by weight of methyl methacrylate, 3 parts by weight of acrylic acid and 100 parts by weight of toluene to react for 10 hours at 100° C. Then, a dispersion prepared by dispersing 40 parts by weight of said acrylic resin, 100 parts by weight of zinc oxide and 1 cc. each of 0.25%-methanol solution of Rose Bengal and 1% methanol solution of Bromophenol Blue in 150 parts by weight of toluene was coated on the surface of the aforesaid intermediary layer of the support and was dried for 1 minute at 130° C., whereby an electrophotographic copying material provided with a photoconductive layer of 10μ thick was prepared.

The electrophotographic copying material thus obtained proved to have superb preservability or durability and water-resisting property as well as statisfactory adhesive property to bind the intermediary layer and the photoconductive layer thereof. Besides, the dark decay of the photoconductive layer thereof was quite slight, showing a remarkable improvement as compared with conventional copying materials. Further, the copied image obtained through dry development as well as wet development of a copy duplicated by this copying material retained a continuous gradation of high fidelity, and there was observed no influence on the developer due to the intermediary layer or the electroconductive layer thereof.

Example 17

(d) A mixture comprising:

| | Parts by weight |
|---|---|
| Methyl methacrylate | 50 |
| Ethyl acrylate | 50 |
| Glycidyl methacrylate | 15 |
| Ammonium persulfate | Small amount |
| Sodium laurylbenzene sulfonate | Small amount |
| Polyvinyl alcohol | Small amount |
| Water | 120 | was caused to react for 6 hours at a temperature in the range of 75–80° C., whereby an epoxy resin was synthesized. Then, a dispersant prapared by dispersing 100 parts by weight of said epoxy resin, 30 parts by weight of trimethylol melamine, 20 parts by weight of thermoplastic acryl resin emulsion and 3 parts by weight of ammonium chloride in 120 parts by weight of water was coated on one side of a slick paper (pulp ratio of N/L: 50/50, thickness: 95μ) in the same way as in case of forming the intermediary layer of Example 1 and was dried, whereby an intermediary layer was formed on the back of said paper support.

Subsequently, another dispersant was prepared by dispersing 100 parts by weight of said epoxy resin obtained by using the above (d), 50 parts by weight of 20% aqueous solution of polyvinyl alcohol, 15 parts by weight of trimethylol melamine, 3 parts by weight of ammonium chloride, 100 parts by weight of clay, 0.3 part by weight of sodium hexamethaphosphate and 20 parts by weight of polyvinylbenpyl-trimethyl ammonium chloride in 500 parts by weight of water, and was coated on the noncoated side of said paper support in the same way as in case of forming the foregoing intermediary layer, whereby an electroconductive layer was formed on the back of said support.

The amount of resin contained in the foregoing intermediary layer and electroconductive layer was 6.5 g./m.$^2$ and 9 g./m.$^2$, respectively, and the surface of said intermediary layer was stable against toluene and displayed a satisfactory water-resisting property.

Next, a photoconductive layer of the same composite as Example 16 was formed in the same way as said example on the surface of said intermediary layer, whereby an electrophotographic copying material was obtained. In this case, said photoconductive layer was 12μ thick.

The electrophotographic copying material thus obtained demonstrated preservability, durability and water-resisting property equivalent to that of the preceding examples, and even in case where it was employed for an offset-printing plate, it was stable against etching liquid or immersion water and any deformation or damage was not observed even after producing more than 4,000 prints. Further, as for the copied image, it could reproduce an image quite faithful to the original.

Example 18

(e) A mixture comprising:

| | Parts by weight |
|---|---|
| Butyl acrylate | 50 |
| Styrene | 50 |
| Glycidyl methacrylate | 15 |
| Ammonium persulfate | Small amount |
| Sodium lauryl benzene sulfonate | Small amount |
| Polyvinyl alcohol | Small amount |
| Water | 120 | was caused to react for 6 hours at a temperature in the range of 75–80° C., whereby an epoxy resin was synthesized. Then, a dispersant prepared by dispersing 100 parts by weight of said epoxy resin, 15 parts by weight of urea-formalin resin and 3 parts by weight of ammonium chloride in 100 parts by weight of water was coated on one side of a slick paper (pulp ratio of N/L: 50/50, thickness: 60μ) in the same way as in case of forming the intermediary layer of Example 1, whereby was formed an intermediary layer on the surface of said paper support.

Subsequently, another dispersant was prepared by dispersing 100 parts by weight of said epoxy resin obtained by using the above (e), 50 parts by weight of 20%-aqueous solution of polyvinyl alcohol, 30 parts by weight of dimethylol melamine, 3 parts by weight of ammonium chloride, 100 parts by weight of clay, 0.3 part by weight of sodium hexamethaphosphate and 20 parts by weight of polyvinylbenzyl-trimethyl ammonium chloride in 500 parts by weight of water, and was coated on the non-coated side of said paper support according to the method of forming the electroconductive layer of Example 1, whereby an electroconductive layer was formed on the back of said support.

The amount of resin contained in the intermediary layer was 6 g./m.$^2$ and 8 g./m.$^2$, respectively, and the surface of said intermediary layer demonstrated a superb water-resisting property.

Next, a photoconductive layer consisting of 100 parts by weight of zinc oxide, 40 parts by weight of vinyl acetate-crotonic acid copolymer (a manufacture of Japan Synthetic Chemical Co., Ltd. sold under the name "Goseran"), 2 cc. of 28% ammonia water, 1.5 cc. each of 0.5% methanol solution of erythrosine, 0.5% methanol solution of fluoresceine and 1% methanol solution of Bromophenol Blue as a sensitizer and 100 cc. of water was coated on the surface of said intermediary layer and was dried for 3 minutes at 160° C., whereby an electrophotographic copying material with a photoconductive layer of 15μ thick formed on the surface of said intermediary layer was obtained.

The photoconductive layer of thus prepared electrophotographic copying material, when compared with the photoconductive layer of an electrophotographic copying material having an intermediary layer consisting mainly of conventional polyvinyl alcohol, proved to have been improved by 50% or more with respect to the dark decay characteristics thereof. Besides, the copied image produced thereby was satisfactory, having a high concentration of image.

Example 19

An intermediate-layer-forming aqueous dispersant consisting of 100 parts by weight of the epoxy resin synthesized by using the mixture of (c) in Example 16, 10 parts by weight of ethylenediamine, 3 parts by weight of ammonium chloride and 100 parts by weight of water and a photoconductive-layer-forming aqueous dispersant consisting of 100 parts by weight of the foregoing epoxy resin, 50 parts by weight of polyvinyl alcohol, 30 parts by weight of ethylene diamine, 3 parts by weight of ammonium chloride, 100 parts by weight of clay, 0.3 part by weight of sodium hexamethaphosphate, 30 parts by weight of polyvinylbenzyl-trimethyl ammonium chloride and 500 parts by weight of water were respectively coated on one side of the same slick paper support as that of Example 16 and dried, whereby an intermediary layer and an electroconductive layer on the surface and the back of said support respectively were formed.

The amount of resin contained in thus formed intermediary layer and electroconductive layer was 7.5 g./m.$^2$ and 9 g./m.$^2$, respectively. The surface of said intermediary layer did not show any change even when immersed in toluene.

Subsequently, a photoconductive-layer-forming toluene dispersant having the same composition as the photoconductive layer of Example 16 was coated on the surface of the foregoing intermediary layer to form a photoconductive layer thereon, whereby an electrophotographic copying material was prepared. Thus obtained electrophotographic copying material proved satisfactory in durability as well as water-resisting property thereof, and was provided with a mighty adhesive property to bind said photoconductive layer and intermediary layer, so that even after a long-term preservation for there was observed no change in its quality. Besides, the dark decay characteristic of its photoconductive layer proved to have been remarkably improved and the occurrence of such phenomena as curling and so on decreased.

What we claim is:

1. In an electrophotographic copying material comprised of an electroconductive support, an intermediate layer and a photoconductive layer containing photoconductive zinc oxide, the improvement wherein said intermediate layer comprises the reaction product of
   (A) a film-forming material selected from the group consisting of
      (1) a polyhydroxy compound selected from the group consisting of polyvinyl alcohol, starch, carboxymethyl cellulose, hydroxyethyl cellulose, and denatured derivatives thereof selected from the group consisting of methylol-starch and amido-starch,
      (2) a water-soluble protein selected from the group consisting of casein, gelatin, albumin, fish glue and denatured derivatives thereof, selected from the group consisting of milk casein and egg albumin,
      (3) or mixtures of (1) and (2),
   (B) glyoxal in an amount in the range of from 0.02 to 0.5 part by weight, per 1 part by weight of said film-forming material.

References Cited

UNITED STATES PATENTS

| | | | |
|---|---|---|---|
| 2,919,205 | 12/1959 | Hart | 117—164 X |
| 3,403,116 | 9/1968 | Ream et al. | 96—1.5 X |
| 3,440,090 | 4/1969 | Matsunaga | 96—1.5 X |
| 3,469,977 | 9/1969 | Savage | 96—1.5 |

GEORGE F. LESMES, Primary Examiner

R. E. MARTIN, Assistant Examiner

U.S. Cl. X.R.

96—1.5; 101—454, 461, 457, 462; 117—155, 156, 161 R, 161 UE, 164, 165; 260—17.4